United States Patent
Yang

(10) Patent No.: US 8,909,772 B2
(45) Date of Patent: Dec. 9, 2014

(54) SYSTEM FOR MONITORING HARD DISK DRIVE

(71) Applicant: Meng-Liang Yang, Shenzhen (CN)

(72) Inventor: Meng-Liang Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 226 days.

(21) Appl. No.: 13/663,581

(22) Filed: Oct. 30, 2012

(65) Prior Publication Data

US 2014/0006603 A1  Jan. 2, 2014

(30) Foreign Application Priority Data

Jun. 28, 2012 (CN) .................. 2012 1 02176324

(51) Int. Cl.
*G06F 15/16* (2006.01)
*G06F 11/32* (2006.01)
*G06F 11/30* (2006.01)

(52) U.S. Cl.
CPC .......... *G06F 11/324* (2013.01); *G06F 11/3034* (2013.01)
USPC ....................................... 709/224; 714/5.11

(58) Field of Classification Search
CPC . G06F 11/324; G06F 11/325; G06F 11/3034; G06F 11/3055; G06F 11/3065; G06F 11/32
USPC .............. 709/200–203, 217–227; 714/1, 5.11
See application file for complete search history.

(56) References Cited

U.S. PATENT DOCUMENTS

| | | | | |
|---|---|---|---|---|
| 7,212,307 B2 * | 5/2007 | Kanda | .......................... | 358/1.16 |
| 7,284,140 B2 * | 10/2007 | Suzuki et al. | ................. | 713/340 |
| 7,739,416 B2 * | 6/2010 | Chikusa et al. | .................... | 710/2 |
| 7,835,305 B2 * | 11/2010 | Onishi | .......................... | 370/254 |
| 8,015,434 B2 * | 9/2011 | Makino et al. | ................. | 714/6.1 |
| 2003/0072033 A1* | 4/2003 | Kanda | .......................... | 358/1.16 |
| 2004/0068670 A1* | 4/2004 | Suzuki et al. | ................. | 713/300 |
| 2007/0016811 A1* | 1/2007 | Suzuki et al. | ................. | 713/300 |
| 2007/0255968 A1* | 11/2007 | Suzuki et al. | ................. | 713/300 |
| 2009/0290249 A1* | 11/2009 | Makino et al. | ................. | 360/31 |
| 2011/0026080 A1* | 2/2011 | Onishi | .......................... | 358/1.15 |
| 2013/0179595 A1* | 7/2013 | Chikusa et al. | .................... | 710/2 |

* cited by examiner

*Primary Examiner* — Moustafa M Meky
(74) *Attorney, Agent, or Firm* — Novak Druce Connolly Bove + Quigg LLP

(57) ABSTRACT

A system for monitoring a number of hard disk drives (HDDs) arranged in a number of servers of a data center. The system includes a number of baseboard management controllers (BMCs) configured to obtain a state of each HDD arranged in a server and output status information corresponding to the state of each HDD, a control module, and a display module. The control module includes an address storage unit storing a number of internet protocol (IP) addresses corresponding to the BMCs, a request unit configured to receive a request of obtaining the status information of each HDD coupled to each BMC, and an analyzing unit configured to obtain the status information outputted by the BMC and analyze the status information to obtain the state of each HDD. The display module is configured to display the state of each HDD.

5 Claims, 2 Drawing Sheets

SYSTEM FOR MONITORING HARD DISK DRIVE

BACKGROUND

1. Technical Field

The present disclosure relates to a system for monitoring hard disk drives.

2. Description of Related Art

A light-emitting diode (LED) for a hard disk drive (HDD) can indicate whether the HDD is normal or not. If the HDD operates normally, the LED emits light. Alternatively, if the HDD is abnormal, the LED does not emit light. Thus, it is critical to know whether the LED emits light or not. However, a data center, for example, may comprise hundreds or thousands of HDDs, and it is inefficient and time-consuming for the user to manually check if all the LEDs emit light or not.

Therefore, there is room for improvement in the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
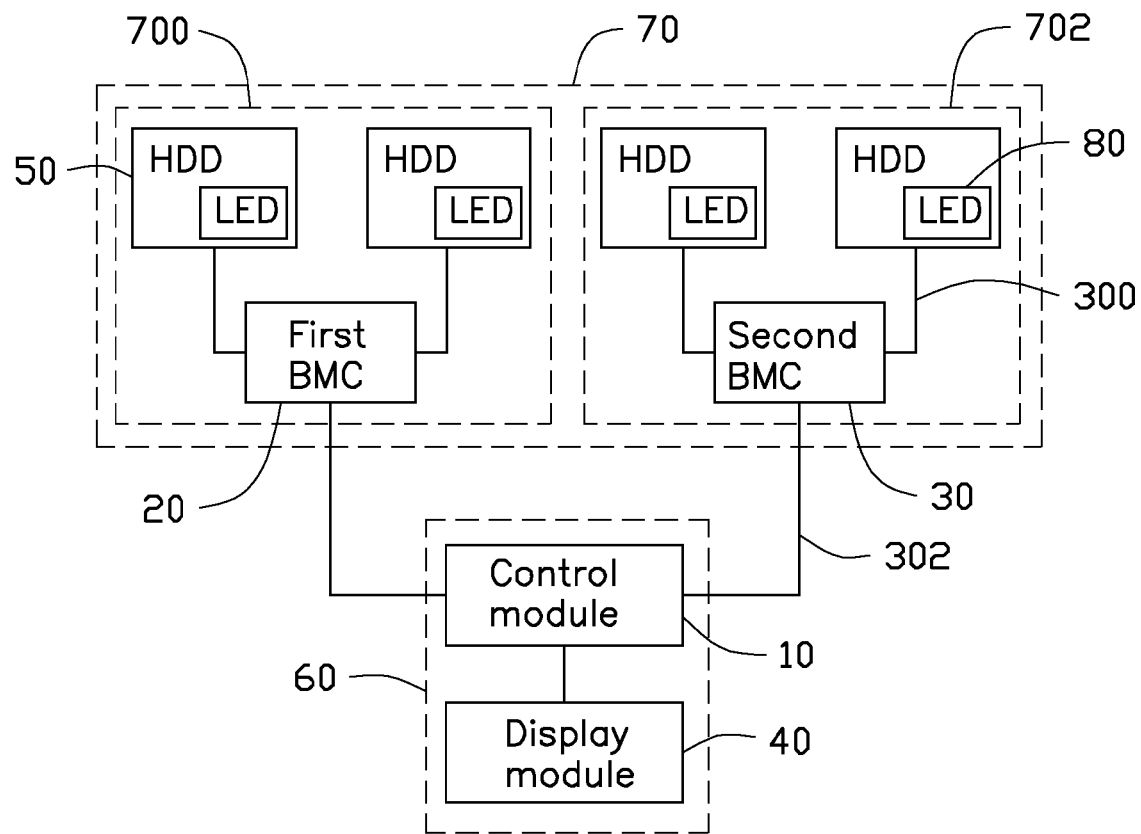
FIG. 1 is a block diagram of an embodiment of a system for monitoring hard disk drives of the present disclosure.

FIG. 1 illustrates an embodiment of a system for monitoring a plurality of hard disk drives (HDDs) 50 of a data center 70. The system includes a plurality of baseboard management controllers (BMCs), a control module 10 connected to the BMCs through a network 302, and a display module 40. In the embodiment, the BMCs include a first BMC 20 and a second BMC 30. A light-emitting diode (LED) 80 is arranged on or to represent each HDD 50 to indicate the working state of the HDD 50.

In the embodiment, the first BMC 20 and two HDDs 50 coupled to the first BMC 20 are mounted in a first server 700, and the second BMC 30 and two other HDDs 50 coupled to the second BMC 20 are mounted in a second server 702. Each of the first BMC 20 and the second BMC 30 can obtain the status of each coupled HDD 50 through a serial general purpose input/output (SGPIO) bus 300.

Each message packet of the SGPIO protocol includes three bits. A first bit of a message packet indicates the operating status of the HDD 50. For example, when the HDD 50 is operating, the first bit of the message packet is a digital "1", and when the HDD is not operating, the first bit of the message packet is a digital "0". A second bit of the message packet is definable by the user. In the embodiment, the second bit of the message packet stands for the connecting information. For example, when the HDD 50 is not plugged into an HDD connector, the second bit of the message packet is "1", and when the HDD 50 is plugged into an HDD connector, the second bit of the message packet is "0".

A third bit of the message packet indicates the status of the HDD 50. When the HDD 50 is working normally, the third bit of the message packet is "0" and the LED 80 of the HDD 50 emits light, and when the HDD 50 is not working normally, the third bit of the message packet is "1" and the LED 80 of the HDD 50 is not illuminated.

When the first BMC 20 and/or the second BMC 30 are to be accessed, an internet protocol (IP) address, a port number, and a user identification, such as a user name and a password, must be predefined. When the user is authorized, the first BMC 20 and/or the second BMC 30 can process requests from the user, such as requests for obtaining the state of each HDD 50. The first BMC 20 and the second BMC 30 can obtain the statuses of the HDDs 50 coupled to the first BMC 20 and the second BMC 30 through the SGPIO bus 300, and can deliver status information as to the statuses of the HDDs 50 to the user through the network 302. The status information includes a plurality of message packets. In another embodiment, the user identification may be unnecessary.

Figure 2:
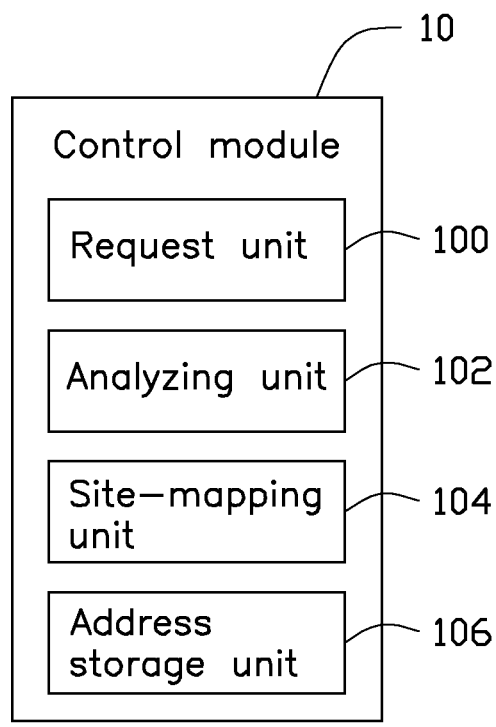
FIG. 2 is a block diagram of a control module of the system of FIG. 1.

FIG. 2 illustrates the details of the control module 10, which includes a request unit 100, an analyzing unit 102, a site-mapping unit 104, and an address storage unit 106. In the embodiment, the control module 10 is arranged in a client 60, the user can obtain the status of each HDD 50 through the client 60.

The address storage unit 106 stores IP addresses for the BMCs 20 and 30, such as a first IP address corresponding to the first BMC 20 and a second IP address corresponding to the second BMC 30.

The site-mapping unit 104 stores location information about each server located in the data center 70 corresponding to the IP address of the BMC of the server. For example, the site-mapping unit 104 stores information that the first server 700 is arranged at a first location of the data center 70 corresponding to the first IP address of the first BMC 20, and that the second server 702 is arranged at a second location of the data center corresponding to the second IP address of the second BMC 30.

The request unit 100 sends the request for the status of the HDD 50 to the BMC according to the IP address stored in the address storage unit 106. For example, when the user needs to access the first BMC 20, the request unit 106 obtains the first IP address from the address storage unit 106, and sends the identification to the first BMC 20 which has the first IP address.

The display module 40 displays the status of each HDD 50, and also any information as to a HDD 50 which is abnormal.

The analyzing unit 102 receives the information of each HDD 50 output from the corresponding BMC, and analyses the information to obtain the status of each HDD 50. For example, when the analyzing unit 102 receives the information concerning the HDD 50 coupled to the first BMC 20, the analyzing unit 102 obtains the second bit of the message packet, to determine if the HDD 50 is connected to the HDD connector. If the second bit of the message packet is "0", the analyzing unit 102 obtains the first bit of the message packet, to determine if the HDD 50 is operating or not. If the first bit of the message packet is "1", the HDD 50 is operating. In order to determine whether the HDD 50 is wording normally or not, the analyzing unit 102 obtains the third bit of the message packet, and determines whether the third bit of the message packet is "1". If the third bit of the message packet is "1", it means that the LED 80 corresponding to the HDD 50 is not illuminated, and the analyzing unit 102 obtains the location of the server 700 from the site-mapping unit 104 according to the IP address for the BMC 20 that is coupled to the HDD 50, and displays the location of the server 700 on the display module 40, so providing a visual warning for the user to know where the server 700 with the abnormal HDD 50 is located. Therefore, the user can investigate and replace the abnormal HDD 50 of which the LED 80 is not illuminated.

While the disclosure has been described by way of example and in terms of preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A system for monitoring a plurality of hard disk drives (HDDs) arranged in a plurality of servers of a data center, comprising:
 a plurality of baseboard management controllers (BMCs) connected to corresponding HDDs, configured to obtain statuses of the corresponding HDDs, and output status information corresponding to the statuses of the HDDs;
 a control module, comprising:
  an address storage unit storing a plurality of internet protocol (IP) addresses corresponding to the BMCs;
  a request unit configured to receive a request for obtaining the status information of each HDD coupled to each BMC; and
  an analyzing unit configured to obtain the status information outputted by the BMC, and analyze the status information to obtain the status of each HDD; and
 a display module connected to the control module to display the status of each HDD.

2. The system of claim 1, wherein the control module further comprises a site-mapping unit, the site-mapping unit stores a location of each server in the data center; wherein the analyzing unit detects the HDD being abnormal by analyzing the status information, and obtains the IP address of the BMC corresponding to the abnormal HDD from the address storage unit, the analyzing unit obtains the location corresponding to the IP address from the site-mapping unit, and the display module displays the location.

3. The system of claim 2, wherein the status information comprises a plurality of message packets, each message packet comprises three bits, a first bit of the message packet stands for an operating status of the HDD, a second bit of the message packet indicates a connection status, a third bit of the message packet indicates a status of a corresponding HDD, the analyzing unit obtains the third bit of each message packet to determine whether the HDD is working normally or not, if the HDD is not working normally, the analyzing unit obtains the location corresponding to the IP address of the BMC coupled to the abnormal HDD.

4. The system of claim 3, wherein each HDD comprises a light-emitting diode (LED), the LED of the abnormal HDD is off in response to the HDD being abnormal.

5. The system of claim 1, wherein the control module communicates with the BMCs through a serial general purpose input output (SGPIO) bus.

* * * * *